(12) United States Patent
Hinkel

(10) Patent No.: US 9,053,006 B2
(45) Date of Patent: Jun. 9, 2015

(54) METHOD FOR MEMORY MANAGEMENT

(75) Inventor: Ralf Hinkel, Hoeringen (DE)

(73) Assignee: MOBOTIX AG, Kaiserslautern (DE)

(*) Notice: Subject to any disclaimer, the term of this patent is extended or adjusted under 35 U.S.C. 154(b) by 1132 days.

(21) Appl. No.: 12/600,753

(22) PCT Filed: May 19, 2008

(86) PCT No.: PCT/DE2008/000825
§ 371 (c)(1),
(2), (4) Date: Jun. 9, 2010

(87) PCT Pub. No.: WO2008/141616
PCT Pub. Date: Nov. 27, 2008

(65) Prior Publication Data
US 2010/0293318 A1   Nov. 18, 2010

(30) Foreign Application Priority Data

May 18, 2007 (DE) .................. 10 2007 023 408

(51) Int. Cl.
*G06F 12/16* (2006.01)
*G06F 12/02* (2006.01)

(52) U.S. Cl.
CPC .... *G06F 12/0246* (2013.01); *G06F 2212/1036* (2013.01); *G06F 2212/7211* (2013.01)

(58) Field of Classification Search
None
See application file for complete search history.

(56) References Cited

U.S. PATENT DOCUMENTS

| 5,406,529 | A | * | 4/1995 | Asano ..................... 365/230.03 |
| 5,822,251 | A | | 10/1998 | Bruce et al. |
| 5,956,743 | A | | 9/1999 | Bruce et al. |
| 6,000,006 | A | | 12/1999 | Bruce et al. |
| 2002/0069321 | A1 | | 6/2002 | Dickinson et al. |
| 2003/0070036 | A1 | | 4/2003 | Gorobets |
| 2003/0200400 | A1 | * | 10/2003 | Nangle ......................... 711/154 |
| 2004/0233282 | A1 | * | 11/2004 | Stavely et al. .............. 348/143 |
| 2005/0281088 | A1 | | 12/2005 | Ishidoshiro et al. |
| 2006/0031626 | A1 | * | 2/2006 | Rapp et al. ................... 711/103 |
| 2007/0083697 | A1 | | 4/2007 | Birrell et al. |

OTHER PUBLICATIONS

European Search Report issued May 2, 2013, in Patent Application No. 13000706.5 (with English Translation of Categories of Cited Documents).

* cited by examiner

*Primary Examiner* — Matthew Bradley
*Assistant Examiner* — Alan Otto
(74) *Attorney, Agent, or Firm* — Oblon, McClelland, Maier & Neustadt, L.L.P.

(57) ABSTRACT

The invention relates to a method for memory management, in which memory usage data relating to the use of the memory is recorded. The memory usage data is determined in response to a number of memory write and/or read accesses.

13 Claims, 1 Drawing Sheet

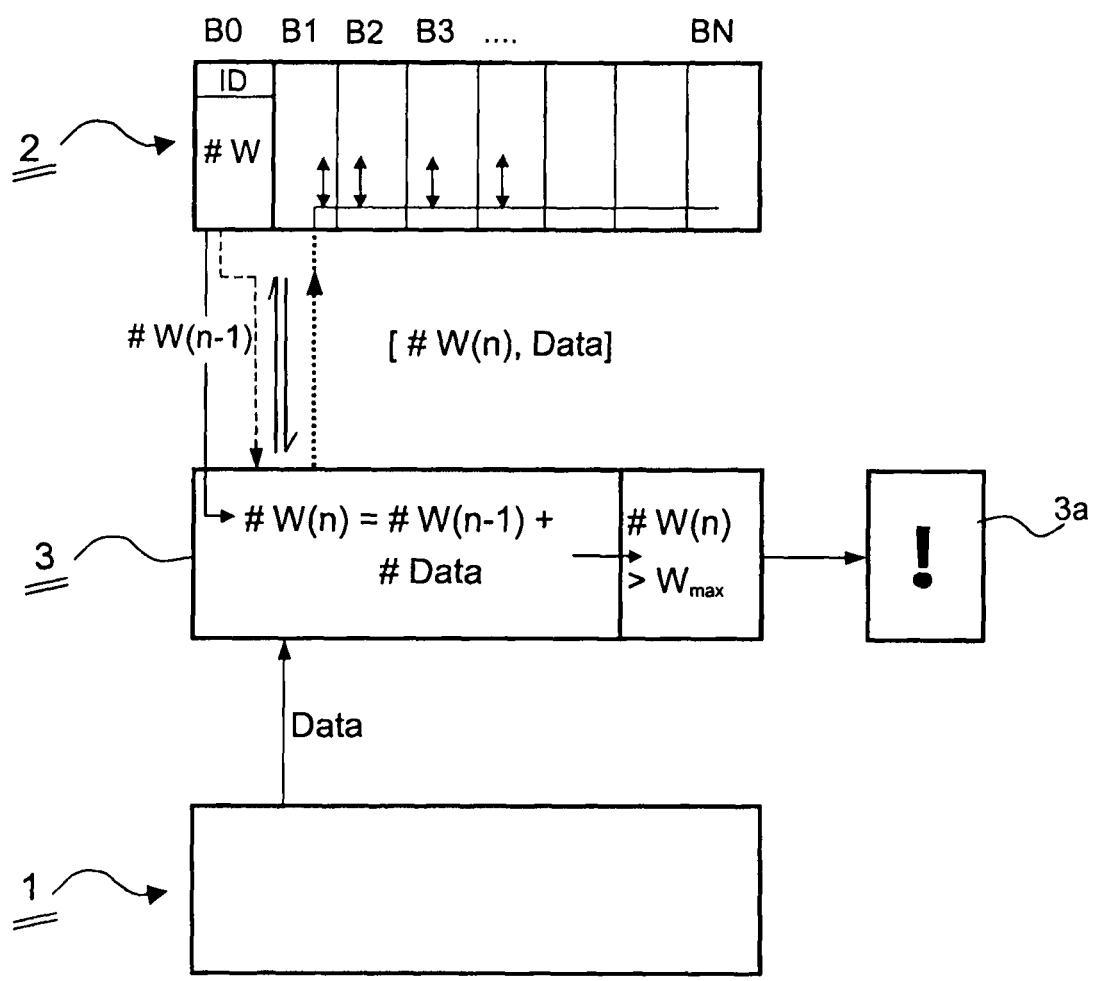

METHOD FOR MEMORY MANAGEMENT

The present invention relates to that which is claimed in the precharacterizing clause and therefore deals with the management of memory.

If data arise in relatively large volumes in a device, they are typically written to memories. The storage medium can then be read again at a subsequent point in time by the writing apparatus in order to obtain the data, or it can be removed and read using another device in order to transport the data in this manner. The problem with this is that data must regularly be stored in such a manner that they can be read again without any problems. The creation of a file allocation table and the like, from which the location in the memory at which particular data can be found can be seen, has been known for a long time for this purpose. In addition to the fact that the location at which data are stored on a storage medium must be known, it is also critical for the re-reading process, however, that the data are not corrupted during the writing/reading operation. Therefore, in the case of storage media such as floppy disks, it was conventional practice to carry out a test during so-called formatting in order to determine whether it is possible to write to all areas without problems or whether there are defective memory areas. This is also known from hard disks etc. In addition, in the case of computer-internal memories such as RAM memories, it is known practice to carry out a memory test during the computer boot phase by writing particular data patterns to the memory and reading them again. If errors occur in this case, a warning message can be output.

However, it is problematic if errors occur or must be detected during operation of a removable storage medium. In this case, a test would result in the need to successively read data and store them again and, if necessary in an intermediate phase, to have to carry out a test for the correct operation of the memory. This is critical with regard to the power consumption for reading, testing and re-writing, which is problematic and complicated, in particular in the case of battery-operated devices, if only a finite computing capacity is available and/or the memory bandwidth is limited.

Memory security becomes particularly problematic when use is made of media which are particularly susceptible to failure, as is the case with electronic storage media, for instance USB sticks, compact flash memory cards and the like. These generally have only a finite number of writing and reading cycles which the storage medium survives before considerable defects can be expected. This makes the use of such storage media at least difficult for security-relevant apparatuses.

The object of the present invention is to provide something novel for commercial use. Preferred embodiments are found in the subclaims.

In a first basic idea, the present invention therefore proposes a method for memory management, in which memory usage data relating to the use of the memory are stored, and in which the memory usage data are determined in response to a number of memory write and/or read access operations.

It is thus essential to the invention that it is not current memory utilization that is saved, but rather that it is recorded how often the memory is accessed. It is thus no longer the filling level which is recorded but instead the wear and tear of the memory, which allows predictions to be made regarding the future memory behavior irrespective of its current filling level. The present method therefore contributes to increasing the reliability of memory use, and it is particularly preferred to also use said method as a method which increases reliability. The number of memory write and/or read access operations in response to which memory usage data are determined can include, on the one hand, a temporal number density, that is to say can signal a particularly high degree of memory use, for instance when the memory is subjected to write or read access operations very often in quick succession. Memory use also becomes more reliable in such a case because access times etc. can be recorded in an improved manner thereby. However, the number of memory write and/or read access operations in response to which memory usage data are determined preferably means the integral quantity of write and/or read access operations, for instance by stating an absolute number of write or read access operations, which is expedient in the case of hard disks for instance because, particularly in the case of memories which are not used much and in which data have to be stored only sporadically, the hard disk which is otherwise at rest often has to be driven again, which results in a particularly large load. Nevertheless, the number of write and/or read access operations will, however, typically be carried out in weighted fashion to the effect that the volume of data which have been written and/or read is simultaneously concomitantly recorded when determining the number in order to determine, for instance, the total volume of data written and/or read since the memory usage data were acquired.

It is possible and preferred in such a case to relate the memory usage data to a number of read or write memory access operations which is known to be the maximum permissible number. In this case, it is comprehensible that numbers of memory access operations which are known to be maximum permissible numbers have to be determined statistically, and in this respect an individual memory being monitored may have a behavior which may differ significantly from the statistically observed average behavior of memories of the same design. Nevertheless, it is possible to relate the memory usage data to such a number, for example in the form of a percentage of memory wear and tear. The typical failure behavior of memories can be concomitantly taken into account in this case, for instance by first of all ensuring during storage medium formatting that no initial failures occur (so-called "infant mortality" of electronic or other apparatuses) and that, if no errors are detected during formatting for example, a number of memory access operations is then used, in which, for example, 95 or 99% of all storage media still operate in an error-free manner, depending on the security requirement of the memory user.

The number can then be recorded, for example, by stating a percentage wear and tear. The memory usage data relating to the number of memory write and/or read access operations may and should preferably be stored on the storage medium itself. This has the advantage that, in the case of removable media for which the method of the present invention and the corresponding drivers are preferred, the relevant data are concomitantly transferred and a user can determine, after reading the corresponding identifier, whether further use is still advisable despite memory use which has not yet been achieved and is carried out as a maximum number of memory access operations which is known to be permissible. This may be denied, inter alia, if a storage medium, for instance in a camera, must be replaced only rarely but the medium has to be accessed intensively there, and a replacement which is possibly complicated because it is associated with movement on the camera or the like has to be carried out only to safeguard memory reliability without the medium per se having already reached a degree of wear and tear which requires replacement.

It will become clear from the above that the method is particularly preferred for removable media. This initially applies to all types of removable media since it will be comprehensible that, for instance, magnetic memories or optical disks which can be written to several times cannot be rewritten to an arbitrary number of times. Nevertheless, the method is also particularly expedient, however, in electronic memories such as USE sticks and/or flash memories since precisely these are often used when data have to be transferred in critical situations such as before presentations or the like. The method is therefore particularly preferred here.

It is also possible to store the usage data of the removable medium on an apparatus which uses the memory, to be precise preferably together with an identifier of the removable medium. This has the advantage that, even when memory usage data are inadvertently deleted, a degree of usage can be at least approximately reproduced since at least one memory identifier, such as a memory designation, is typically not changed when deleting files and deleting operations are typically carried out after reading, that is to say not during the more frequent writing operations in devices which have to provide data in the long term. With the significant use with monitoring devices such as cameras, the usage data may be stored in a memory such as an EEPROM; this is advantageous because power failure safety is thus ensured.

In the preferred variant, an indication is generated and/or further storage of data on the medium is prevented when a threshold value is exceeded. In addition to generating an indication when a threshold value is exceeded, it is also possible to display or generate an indication relating to the usage state continuously or on request or the like. This may be effected, for example, by means of a bargraph (LCD bar etc.).

Whether both steps—generating an indication and preventing new storage—are undertaken will depend on how critical the retention of the data actually is and whether indications can be immediately transmitted if necessary. This is the case, for instance, with network-linked cameras which can automatically establish a connection in order to transmit warnings to an administrator or the like or to permanently communicate via a network. Such an indication may be effected, for example, in the form of an SMS signal, in the form of an e-mail, using pagers etc. but may also be effected optically, for example by means of a flashing LED on the device or in the vicinity of the latter or a control center.

Protection is also claimed for the operation of an apparatus in such a manner that the method is carried out as well as for drivers for operating a storage medium according to one of the methods described. At the same time, protection is claimed for data storage media on which such drivers are stored. Protection is also claimed for storage media having a memory area in which data generated according to the method are stored, and protection is claimed for apparatuses with an option for using a removable storage medium which is used according to the method according to the invention.

The invention is described only by way of example below using the drawing, in which FIG. 1 illustrates a diagram relating to the execution of the method.

According to FIG. 1, an apparatus 1 which is generally denoted as 1 is designed to provide data for a memory 2, said apparatus being designed in such a manner that memory data #W (n) relating to the use of the memory are likewise provided for the memory 2, in which case these memory usage data should be determined in response to a number of memory write and/or read access operations.

In the present example, the apparatus 1 is a monitoring camera which continuously stores or provides monitoring data in the memory 2.

In the present case, the memory 2 is a USB stick whose storage capacity suffices to be able to record the image data from the monitoring camera 1 for a particular monitoring period, for example one week, without changing the storage medium and without overfilling the memory. The camera 1 is designed to overwrite the oldest image data on the USB stick after one week. Moreover, the USB stick, as known in electronic removable storage media per se, is designed to uniformly distribute the data to be stored over blocks in a manner which is transparent to the user in such a way that, as far as possible, all blocks are uniformly used to the greatest possible extent.

The memory blocks provided for storing image data to be recorded are denoted as B1 to BN in FIG. 1. The volume of data which occurs at a given storage time, for example when storing a frame, is denoted as #Data. In this case, this volume or size of the data block to be stored should be strictly distinguished in the present case from the actual data themselves.

According to the invention a memory block B0 in the USB memory 2 is now reserved, in which a number #W which is indicative of the total number of write access operations performed on the storage medium 2 is stored. Provision is also made of a stage 3 which can be implemented, in particular, by the operating system of the camera 1 and in which the volume of data #Data to be currently stored is added to the total volume of data already previously stored on the USB stick #W (n−1) in order to obtain a current total measure #W (n) of volumes of data which have been written overall to the USB stick 2 since the beginning of acquisition of memory usage data. The number #W (n) relating to the total number of recorded memory write and/or read access operations is compared in the present case with a maximum measure $W_{max}$ which specifies how large the number of memory access operations can be on statistical average before errors increasingly occur as a result of memory wear and tear. As a result of this comparison, a warning, indicated at 3a, can be output when a critical number is exceeded and, on the other hand, the updated measure of integral memory use #W (n) can be stored as new memory usage data in the block B0. It is comprehensible that the warning which is indicated at 3a can be stored on the storage medium in order to be optionally read with data as soon as a user removes the USB stick and removes data from the latter, and/or that remote maintenance can be requested. Alternatively, a warning can incidentally be generated when reading the memory. All of this takes place on the basis of the comparison of the actual access operations with a statistically determined maximum number of access operations which are typically possible without significant quantities of failures already having to be observed. However, it is pointed out that a memory check, for example by means of a parity check, can nevertheless be additionally carried out on a regular basis in order to also issue warnings when a specific malfunction is determined. Specific memory fields can also be used to output a warning.

The invention is used as follows:

If a new USE mass memory or other removable mass memory is connected to the apparatus 1, the storage medium is first of all initialized by writing a memory identifier ID to the memory block B0 and recording that the number of write access operations #W (0) recorded for this medium is identically equal to zero. After this initialization, the apparatus 1 is activated and the storage of data on the USB stick is begun. With each data block which is intended to be transmitted to and stored on the USB stick, the previous number of memory access operations #W (n−1) which have already taken place is updated by reading this number from the block B0 and adding the size of the data block #Data to be currently written to this number. The result #W (n) which is obtained and is indicative of the current quantity of write access operations which have already been performed overall on the USB stick is then written to the block B0 while overwriting the previous result #W (n−1). The data are transmitted to the blocks B1 to BN. It is pointed out that, insofar as an increased amount of wear and tear can be expected as a result of regularly accessing the block B0, the distribution of data to physical memory blocks which is known per se may also include the block B0. In this respect, it is not absolutely necessary for the memory usage data to be regularly physically written to the same memory location, with the result that more frequent access than to other memory locations does not take place there.

If a user removes the USB stick after a particular amount of time, for instance because a critical event was observed and the image data relating thereto have to be evaluated, he will provide another USB stick in the camera so that the image data recording can be continued. This other USB stick will either already have an identifier ID in the block B0 and will also contain the number of data blocks which have already been stored on the replaced USB stick during earlier use of the memory, with the result that the earlier value #W (n−1) for the replaced USB stick can be updated each time data are written, or the replaced USB stick has not yet been used in a monitoring camera and accordingly does not have a corresponding identifier, with the result that the latter must be created by means of initialization as stated above. In this case, it is assumed where appropriate that the USB stick has not been significantly used before, which is typically uncritical because intensive use is made of memory particularly during continuous operation in monitoring apparatuses, whereas, otherwise, the volume of data stored by an ordinary user on USB sticks, for instance during office work, is at best small.

The previously removed USB stick can then be read, in which case, a measure of the wear and tear of said USB stick can simultaneously be concomitantly read in the reader, for example a laptop brought to the camera, in order to make a decision on the further use of the memory. It is thus possible to determine that a replacement is then already necessary because the USB stick which has been read probably can no longer be used for more than a further three weeks but the typical maintenance intervals are generally longer at four weeks.

A display, for example in the form of an LCD or the like, may also likewise be provided on the USB stick itself, which display automatically responds during operation. USB-internal microcontrollers may suffice for this purpose, which microcontrollers only compare the value #W in the block B0 with the value $W_{max}$ which has been defined for the USB stick by the manufacturer or user, in order to activate a warning or a bargraph, for example.

It is pointed out that it is possible to avoid the repeated use of cells, in particular for the purpose of storing usage data, by using a suitable operating system and/or file system. In this case, usage data may additionally be concomitantly continuously stored after each data block or data stream with data which are to be stored and are cyclically stored in the address space. The total use can then be obtained from these data. The practice of preferably cyclically running through the address space also changes the storage position of the usage data. The usage data need not be written afterwards, in particular if the amount of data to be stored is known.

The invention claimed is:

1. A method for managing a removable flash memory in a camera used for security relevant surveillance, the method comprising:
    storing image data on the removable flash memory;
    determining data indicating present wear of the removable flash memory in response to at least one of write and read cycles having taken place since creation of memory usage data;
    storing, on the removable flash memory, the data indicating present wear together with the image data in a cyclic manner in address space, to avoid repeated use of cells for storing the memory usage data;
    storing, on the camera, the data indicating present wear together with a memory identifier of the removable flash memory;
    comparing the data indicating present wear with a maximum number; and
    generating a warning upon exceeding a threshold value so as to ensure reliability of the removable flash memory prior to the removable flash memory having reached a wear necessitating an exchange thereof.

2. The method according to claim 1, further comprising: storing data relating to the maximum number, which corresponds to a maximum number of memory access operations known to be reliable.

3. The method according to claim 1, further comprising: storing data relating to a number of at least one of memory write and read access operations on the removable flash memory.

4. The method according to claim 1, wherein the removable flash memory is one of a USB stick and a flash card memory.

5. The method according to claim 1, further comprising: preventing further storage on the removable flash memory when the threshold value is exceeded.

6. A non-transitory computer-readable storage medium including computer executable instructions, wherein the instructions, when executed by a computer, cause the computer to perform a method for managing a removable flash memory in a camera used for security relevant surveillance, the method comprising:
    storing image data on the removable flash memory;
    determining data indicating present wear of the removable flash memory in response to at least one of write and read cycles having taken place since creation of memory usage data;
    storing, on the removable flash memory, the data indicating present wear together with the image data in a cyclic manner in address space, to avoid repeated use of cells for storing the memory usage data;
    storing, on the camera, the data indicating present wear together with a memory identifier of the removable flash memory;
    comparing the data indicating present wear with a maximum number; and
    generating a warning upon exceeding a threshold value so as to ensure reliability of the removable flash memory prior to the removable flash memory having reached a wear necessitating an exchange thereof.

7. A device comprising:
    a storage unit configured to store image data on a removable flash memory;
    a determining unit configured to determine data indicating present wear of the removable flash memory in response to at least one of write and read cycles having taken place since creation of memory usage data;
    a comparing unit configured to compare the data indicating present wear with a maximum number; and
    a generating unit configured to generate a warning upon exceeding a threshold value so as to ensure reliability of the removable flash memory prior to the removable flash memory having reached a wear necessitating an exchange thereof, wherein the storage unit is configured to store, on the removable flash memory, the data indicating present wear together with the image data in a cyclic manner in address space, to avoid repeated use of cells for storing the memory usage data, and store, on the device, the data indicating present wear together with a memory identifier of the removable flash memory.

8. The method according to claim 1, wherein the maximum number indicates a statistical average of memory access operations before errors of wear of the removable flash memory occur.

9. The method according to claim 1, further comprising: continuously recording image data by the camera to the removable flash memory for a predetermined period of time.

10. The method according to claim 1, further comprising: displaying the warning on a display.

11. The method according to claim 1, wherein the generating generates the warning in the form of one of an SMS signal and an e-mail.

12. The method according to claim 1, further comprising: continuously displaying the memory usage data on a display in the form of a bar graph.

13. The method according to claim 1, wherein the data indicating present wear represents a number of total wear of entirety of the removable flash memory.

* * * * *